US006782327B2

(12) United States Patent
Nishijima

(10) Patent No.: US 6,782,327 B2
(45) Date of Patent: Aug. 24, 2004

(54) METHOD AND APPARATUS FOR MEASURING MATERIAL

(75) Inventor: Sakae Nishijima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 386 days.

(21) Appl. No.: 09/939,641

(22) Filed: Aug. 28, 2001

(65) Prior Publication Data

US 2002/0026285 A1 Feb. 28, 2002

(30) Foreign Application Priority Data

Aug. 29, 2000 (JP) ...................................... 2000-259453

(51) Int. Cl.[7] .............................................. G06F 17/00
(52) U.S. Cl. .......................................... 702/50; 702/55
(58) Field of Search .............................. 700/28, 29, 31, 700/33, 44–46, 72, 77, 213, 240, 241; 702/45, 50, 55, 100, 101

(56) References Cited

U.S. PATENT DOCUMENTS

| 4,200,203 A | * | 4/1980 | Rider | 222/14 |
| 4,572,405 A | * | 2/1986 | Miura | 222/642 |
| 5,249,129 A | * | 9/1993 | Lamoureux et al. | 700/240 |
| 5,431,302 A | * | 7/1995 | Tulley et al. | 222/59 |
| 5,975,747 A | * | 11/1999 | Flaherty | 700/240 |
| 6,097,993 A | * | 8/2000 | Skupin et al. | 700/240 |
| 6,173,214 B1 | * | 1/2001 | Neelay et al. | 700/240 |
| 6,499,517 B2 | * | 12/2002 | Hansen | 141/196 |

* cited by examiner

*Primary Examiner*—Marc S. Hoff
*Assistant Examiner*—Craig Steven Miller
(74) *Attorney, Agent, or Firm*—Young & Thompson

(57) ABSTRACT

A method and apparatus for obtaining accurate measuring of material a system where stopping element which stops feeding the material has a time delay which takes a certain time to stop the feeding completely after receiving a stopping signal. The apparatus includes feeding line which is capable of changing feeding rate from high to low when a total fed amount reaches a predetermined alerting amount, preset amount calculator for determining the current preset amount value by multiplying the time delay by a detected feeding rate and a controller for generating a signal to actuate the stopping element to stop the feeding when the total fed amount reaches a value of difference between the intended amount and the current preset amount.

11 Claims, 7 Drawing Sheets

FIG. 4
(A) STATUS OF VALVES
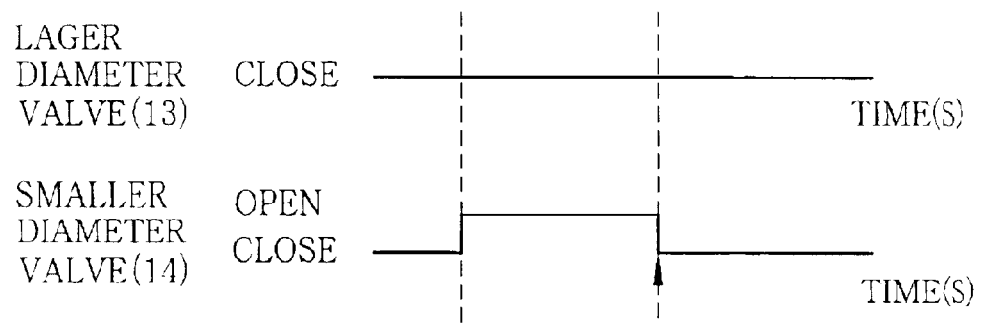
(B) FEEDING RATE
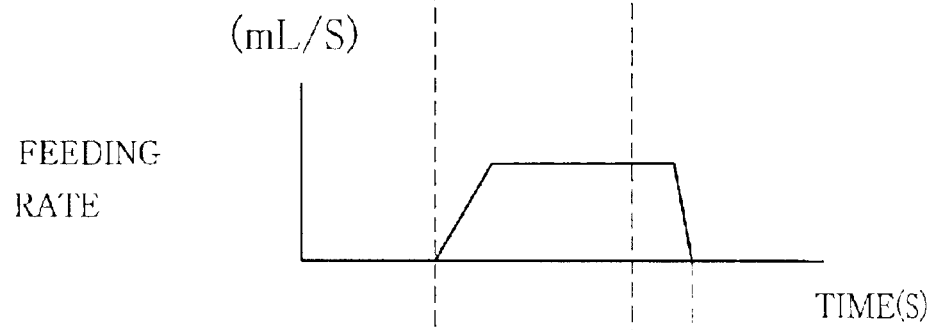
(C) TOTAL FED AMOUNT
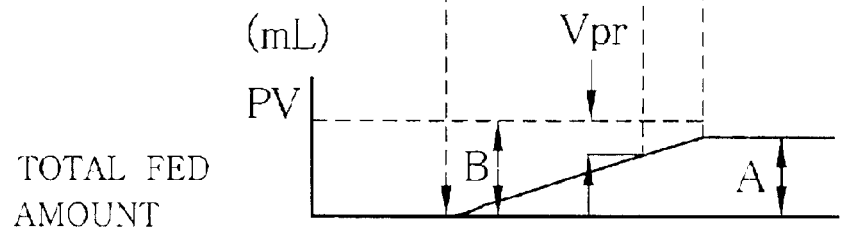

METHOD AND APPARATUS FOR MEASURING MATERIAL

FIELD OF THE INVENTION

This invention relates to a controlling apparatus to obtain an intended exact amount of materials by using a flow mater or a weight measuring scale.

BACKGROUND OF THE INVENTION

In a batch measuring system where liquid reserved in a vessel such as stock tank is fed into a preparation vessel by a intended amount to be obtained (hereinafter referred to simply as intended amount) through a feed line of tube with a stopping valve, pre-set amount value, so-called overrun, defined as an amount to be fed after the system generates a signal to stop the valve is estimated in advance before starting the feeding and the value is stored as a fixed one in memory, and after starting feeding, a signal for stopping the valve is generated when a total fed amount PV reaches the value (A−Vpr), wherein A is a intended amount and Vpr is the pre-set amount.

To shorten the measuring time for obtaining the intended amount, the system usually has main feed line with a larger diameter tube and valve and bypass feed line with a smaller tube and valve. At starting feeding both feed lines are used to make a higher flow rate and the larger diameter valve is closed to make the flow rate slow down when the total fed amount PV reaches the value (A−B): wherein A is a intended amount and B is an alerting amount. The alerting amount is an appropriate amount to determine the timing to shift the feeding rate from high to low because generally low feeding rate is easier in accurately controlling the feeding amount than high feeding rate. If the timing is too early, it will take a long time to obtain the intended amount because the large diameter feed line is closed too early. Thus the alerting amount is determined as relatively very small amount taking total feeding time and control accuracy into consideration.

However, if a value of the intended amount is close to the alerting amount value, i.e. a very small amount, the shift of the feeding rate from high to low is caused immediately after starting feeding at high feeding rate. It may end up finishing the feeding before the bypass feeding flow does not reach stable state, which leads to inaccurate measuring.

Another cause of inaccurate measuring is variation of feeding rate because the variation may make the pre-set amount improper due to its fixed value estimated before starting.

SUMMARY OF THE INVENTION

The object of the invention is to provide a controlling apparatus and a controlling method of materials to maintain good accuracy specially in the case where the feeding rate is varied and/or the intended amount is very small.

To accomplish the object, method for controlling a feeding amount of material of the invention to obtain an intended amount of material with high accuracy comprises steps of: detecting a feeding rate; calculating a total fed amount based on the detected feeding rate; shifting the feeding rate from high to low when the total fed amount reaches a value of difference between the intended amount and the alerting amount; calculating a preset amount based on the detected feeding rate and delay time of stopping means to stop feeding the material; and generating a signal to work the stopping means when the calculated total fed amount reaches a value of difference between the intended amount and the preset amount.

A feeding amount controlling apparatus of the invention to obtain an intended amount of material with high accuracy comprises feeding means for feeding a material; feeding rate detecting means for detecting feeding rate of the material; total fed amount calculating means for calculating current total fed amount; stopping means for stopping feeding the material; preset amount calculating means for calculating preset amount by multiply current feeding rate detected by the feeding rate detecting means and delay time together defined as a time from generating a signal for working the stopping means to stopping the feeding completely ;and controlling means for generating the signal to work the stopping means when total fed amount reaches a value defined as the difference between the intended amount to be measured and the preset amount.

It is preferable that the feeding means has feeding rate changing mechanism and the controlling means generates a signal to change the feeding rate from high feeding rate to low one when the total fed amount reaches a value of difference between the intended amount and a predetermined amount (alerting amount).

BRIEF DESCRIPTION OF DRAWINGS

FIG. 4 is a graph showing a relation between valve operations, a feeding rate and a total fed amount PV when an intended amount is less than or equal to an alerting amount.

DETAILED DESCRIPTION OF THE INVENTION

Figure 1:
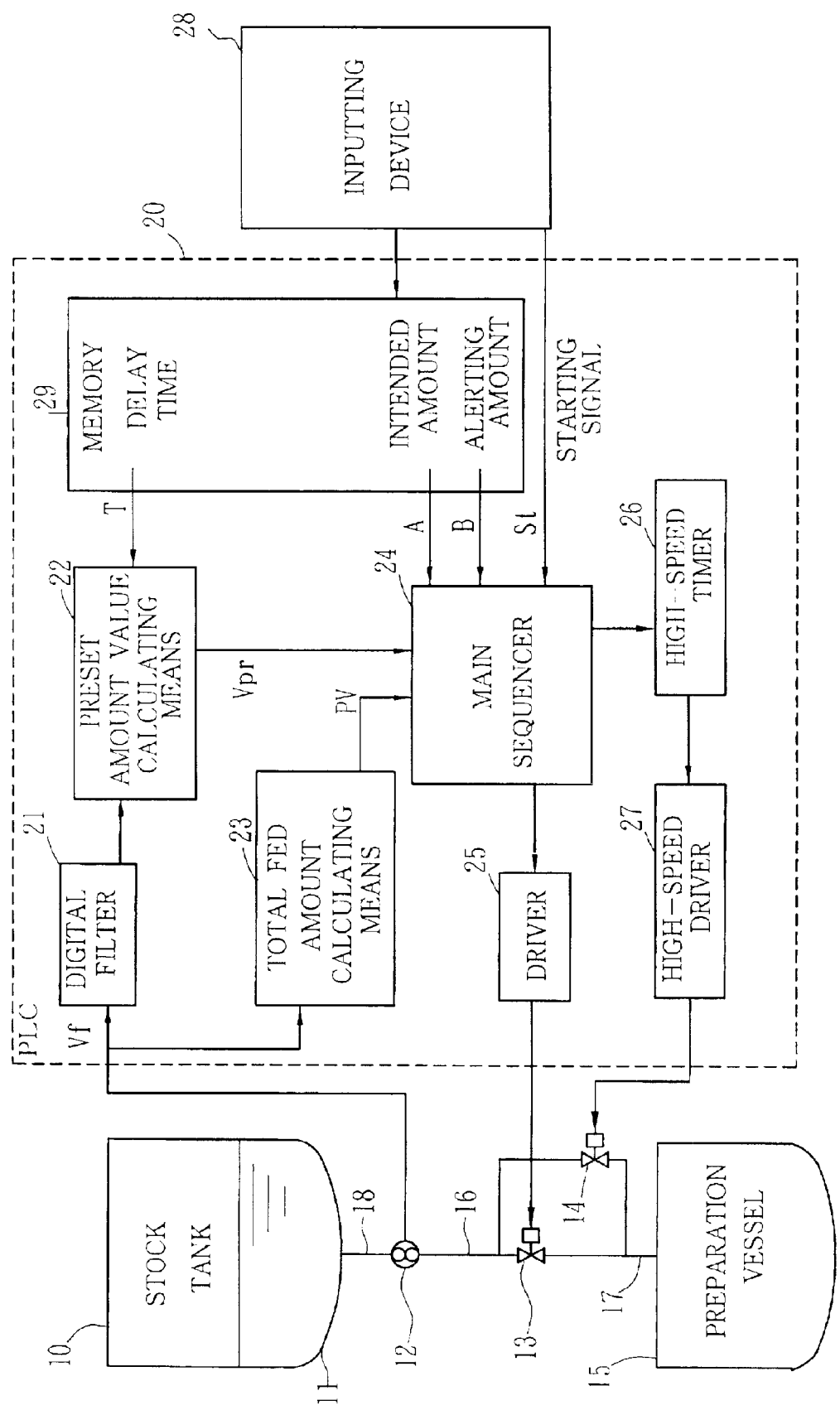
FIG. 1 shows a schematic and block diagram illustrating a batch (material feeding amount) controlling apparatus of the invention.

FIG. 1 shows a schematic and block diagram illustrating a batch feeding amount controlling apparatus of the invention. Liquid 11 reserved in a stock tank 10 is fed into a preparation vessel 15 through a flow meter 12, a large diameter valve 13 and a small diameter valve 14. A base feeding line of tube is branched at some midpoint therein to make primary line with the large diameter valve 13 and secondary line with the small diameter valve 14 which constitutes bypass line. A flow meter 12 is disposed in the base feeding line between the branching point and the stock tank 10, the upper part 18 and lower part 16.

The flow meter 12 detects a feeding rate of the liquid 11 flown down from the stock tank 10 and generates a feeding rate signal Vf to transmit to a measuring controller, PLC (programmable controller) 20. Programming produces functional block such as a digital filter 21, a preset amount value calculating means 22, a total fed amount calculating means 23, a main sequencer 24, a driver 25, a high-speed timer 26 and a high-speed driver 27. The digital filter 21, the preset amount value calculating means 22, the total fed amount calculating means 23, the main sequencer 24 and the driver 25 are operated at slow-scanning rate of 1.0 Hz and the high-speed timer 26 and the high-speed driver 27 are operated at fast-scanning rate of 100 Hz A delay time T, intended amount A, an alerting amount B and measuring starting signal St are input via an inputting device 28 such as keyboard. Then others than measuring starting signal St are stored in the memory 29. Those data can also be input from external other system controller instead of above manual input.

The digital filter 21 functions as a low pass filter with respect to feeding rate signal Vf(mL/s) generated from the flow meter 12, which helps preset amount value calculating means 22 obtain a stable value. The preset amount value calculating means 22 calculates the preset amount value Vpr by multiplying Vf (feeding rate signal) by T (delay time) and generate a signal of the value Vpr to transmit to the main sequencer 24. The feeding rate signal Vf is also transmitted to the total fed amount calculating means 23 where the current total fed amount PV is calculated at one second intervals. A signal of PV is also transmitted to the main sequencer 24. The main sequencer 24 processes those signals including the intended amount A and the alerting amount B stored in the memory 29 according to the program to generate a signals to work the stopping means after starting signal St is input from the inputting device 28.

Figure 2:
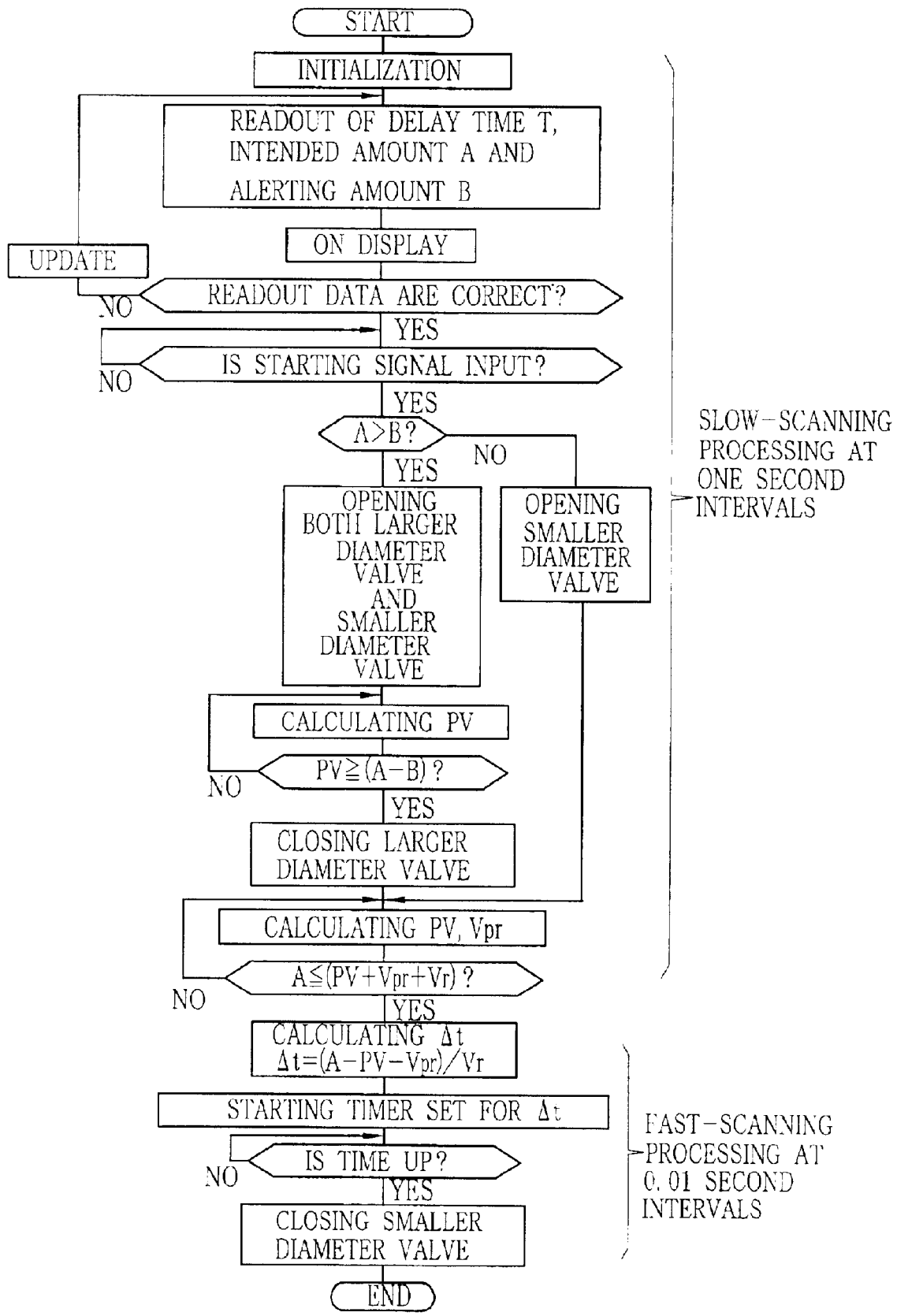
FIG. 2 shows a flow chart of controlling process procedure of the invention.

FIG. 2 shows a flow chart of controlling process procedures of the invention, those procedures are performed in the main sequencer 24. After the initialization of the sequencer 24 after the power on, the values of the delay time T, the intended amount A and the alerting amount B, which have been stored in the memory 29, are read out and displayed on a monitor (not shown). The values are kept in the memory 29 unless they are renewed, so the same values will be on the monitor unless they are renewed.

Then, after a starting signal St is input by operator, the values of intended amount A and alerting amount B are compared to each other. If the value A is larger than the value B, both of the large diameter valve 13 and the small diameter valve 14 are opened (to flow down the liquid through the both main feeding line and bypass line.) On the contrary, if the value A is less than or equal to the value B, only the small diameter valve 14 is opened to keep low feeding rate in order to obtain better measuring accuracy without overrun in the case of small amount measuring.

In the case where both large and small diameter valves are kept opened:

The current total fed amount PV is calculated by the total fed amount calculating means 23 using the feeding rate signal Vf from the flow meter 12. When the value PV reaches or exceed a comparing value which is a value of difference between the intended amount A and the alerting amount B, the larger diameter valve 13 is closed. In the next stage where only the smaller diameter valve 14 is kept opened, it is determined that when the valve 14 should be shut off based on the intended amount A, calculated pre-set amount Vpr, the current total fed amount PV and the feeding rate Vf.

The preset amount value Vpr is obtained by the calculating means 22 as a product by multiplying Vf input via the digital filter 21 by delay time T. The value Vpr is calculated at one second intervals based on the current feeding rate value stabled by the low pass filter 21. A process for determining a timing to shut off the smaller diameter valve 14 is carried out by fast-scanning rate at one hundredth (0.01) second intervals (100 Hz). Thus the smaller valve 14 can be shut off at the exact time when it needs.

Figure 3:
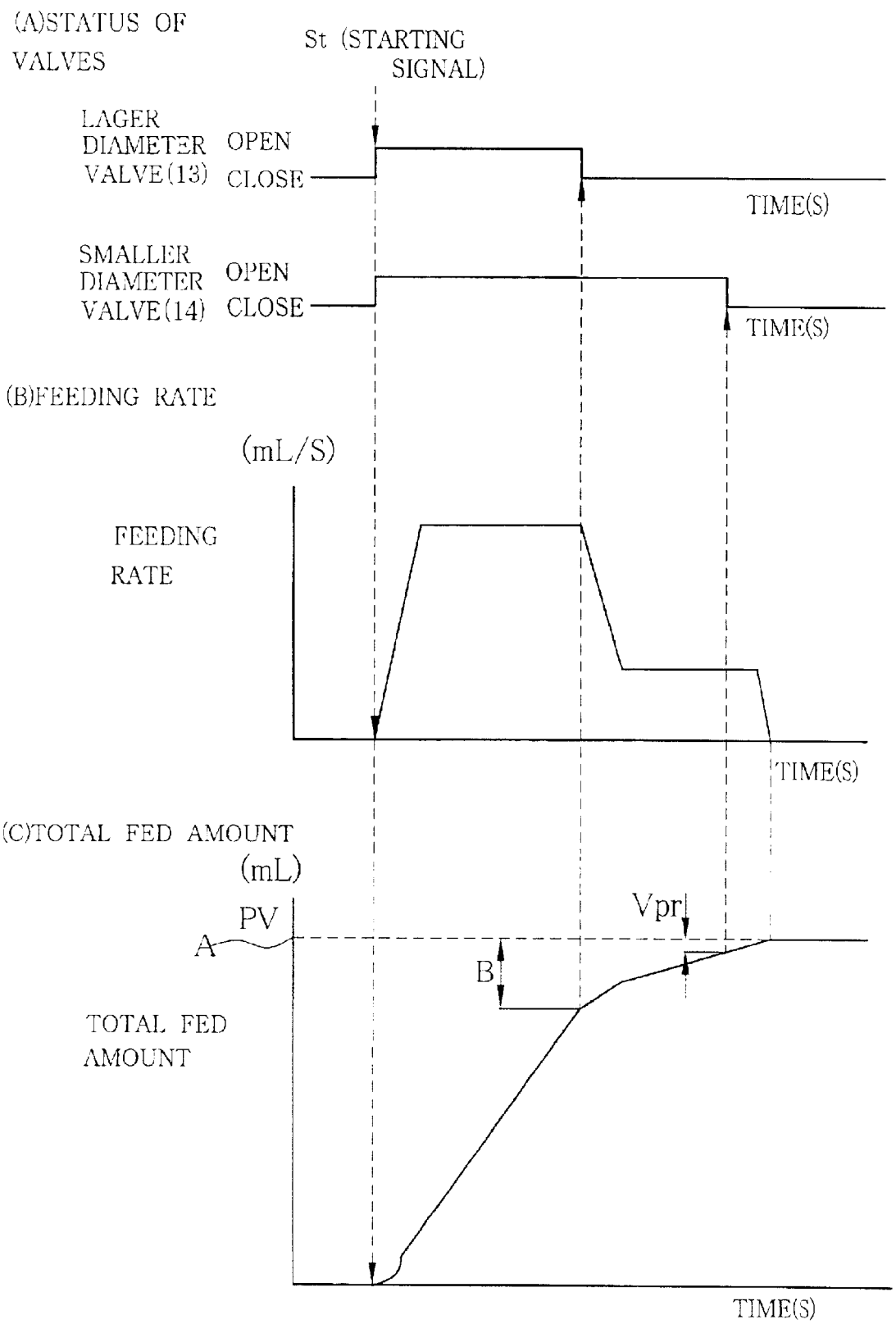
FIG. 3 is a graph showing a relation between valve operations, a feeding rate and a total fed amount PV when an intended amount is more than an alerting amount.

FIG. 3 and FIG. 4 shows a relation among operations of the larger diameter valve 13 and the smaller one 14, the feeding rate signal Vf from the flow meter 12 and the total fed amount PV from the total fed amount calculating means 23. FIG. 3 is for the case where the intended amount value A is larger than the alerting amount value B and FIG. 4 is for the opposite case where the value A is less than or equal to the value B.

In FIG. 3, upon inputting the measuring starting signal St (by operator), the larger diameter valve 13 and the smaller diameter valve 14 are opened to feed down the liquid 11 from the stock tank 10 to the preparation tank 15 at higher feeding rate. After the flow reaches stable state (practically after a predetermined time measured by a mask timer), the feeding rate is measured at regular intervals, for example at one second intervals (1 Hz). The preset amount value Vpr is obtained in a way as explained based on the measured feeding rate. The total fed amount PV is also calculated at one second intervals by the total fed amount calculating means 23, and the larger diameter valve 13 is actuated to close via a driver 25 when the value PV reaches the comparing value, i.e.(A−B).

Then the determination process of whether the smaller diameter valve 14 should be closed or not is carried out based on the current preset amount value Vpr, intended amount value A and a predicted feeding amount Vr which is a increase of total fed amount in the following predetermined time period defined as a product of current feeding rate Vf(mmL/s) and a predetermined time period(s), for example, one second. If a summation of the current total fed amount PV, the current preset amount value Vpr and the predicted feeding amount Vr, i.e. ( PV+Vpr+Vr) is more than or equal to the intended amount value A, fast processing with 100 Hz scanning for closing the valve 14 is made. If the summation value (PV+Vpr+Vr) is still less than the intended amount value A, slow processing with 1 Hz scanning is continued to calculate PV and Vpr for comparing the summation value with the intended amount value A until the summation value becomes equal to or more than the intended amount value.

The fast processing of 100 Hz scanning is performed for closing the smaller diameter valve 14. That is Δt, which represents how long the feeding should be kept before starting closing the valve(before generating a signal for closing the valve), is calculated according to the following equation: Δt=(A−PV−Vpr)/Vr. Then the time Δt is set on a high-speed timer 26 to generate a valve closing signal via a high-speed driver 27 when Δt passes.

Figure 5:
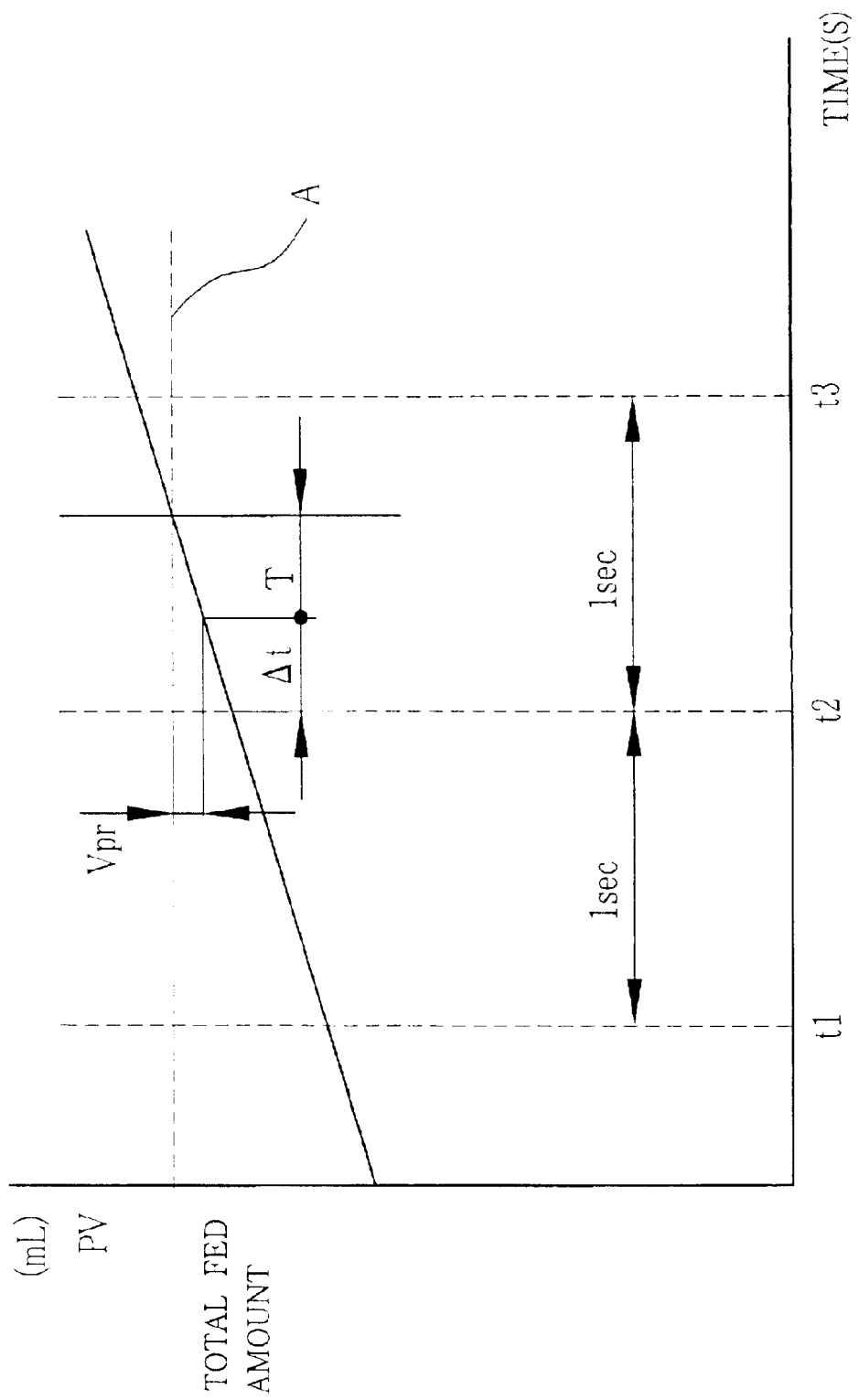
FIG. 5 is a graph showing a relation between a small diameter valve closing operation and a total fed amount PV.

FIG. 5 is a graph showing the timing of closing the smaller diameter valve 14, wherein t1, t2 and t3 indicate the time at which the slow-scanning at one second intervals is made. If it is determined that the summation value (PV+Vpr+Vr)predicted at t2 will exceed the intended amount value A at t3 one second after t2 judging from the comparison of the two values, Δt is calculated and set on the high-speed timer 26 to generate a valve closing signal when Δt passes, which are carried out by the fast processing.

As shown in FIG. 4, in the case where the intended amount value A is less than or equal to the alerting amount value B, upon inputting the measuring starting signal St (by operator), only the smaller diameter valve 14 is opened to feed down the liquid 11 from the stock tank 10 to the preparation tank 15 at lower feeding rate. The following process is the same as in the case described above, that is, the preset amount value Vpr and the predicted feeding amount Vr are calculated and Δt is determined according to the equation Δt=(A−PV−Vpr)/Vr when the summation value (PV+Vpr+Vr) is to exceed the intended amount value A, and the value of Δt is set on the high-speed timer.

In the embodiment described above, the controlling system has two feeding lines with a larger diameter valve and a smaller diameter valve respectively to change the feeding rate from high feeding rate to low one. Modified system, for example, one feeding line with only one valve capable of changing the openings or with two valves in series can be used for the same purpose as long as those modification can change the feeding rate from high to low to easily control the feeding of small amount in the final stage.

Figure 6:
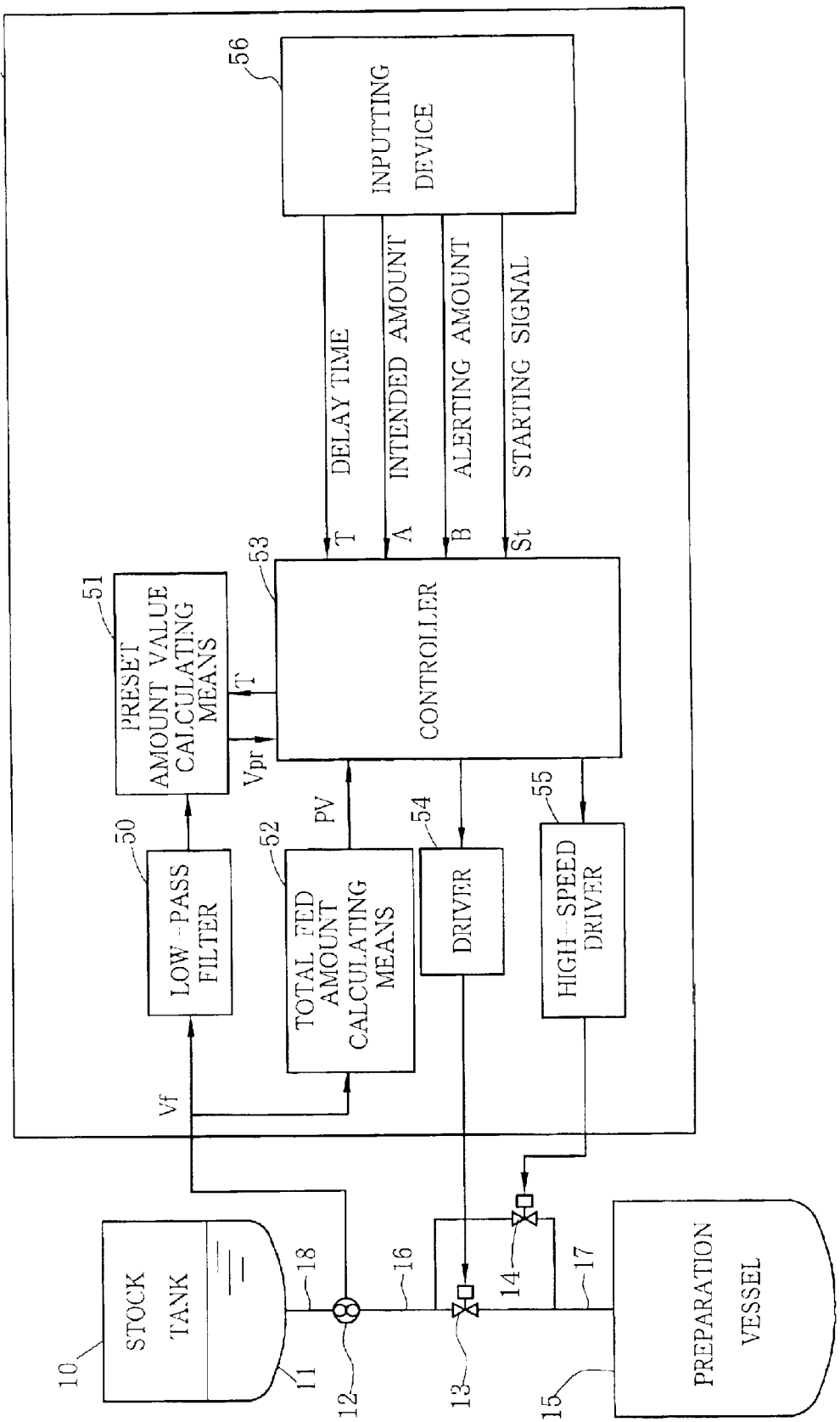
FIG. 6 shows a schematic and block diagram illustrating a batch feeding amount controlling apparatus of another embodiment of the invention.
Figure 7:
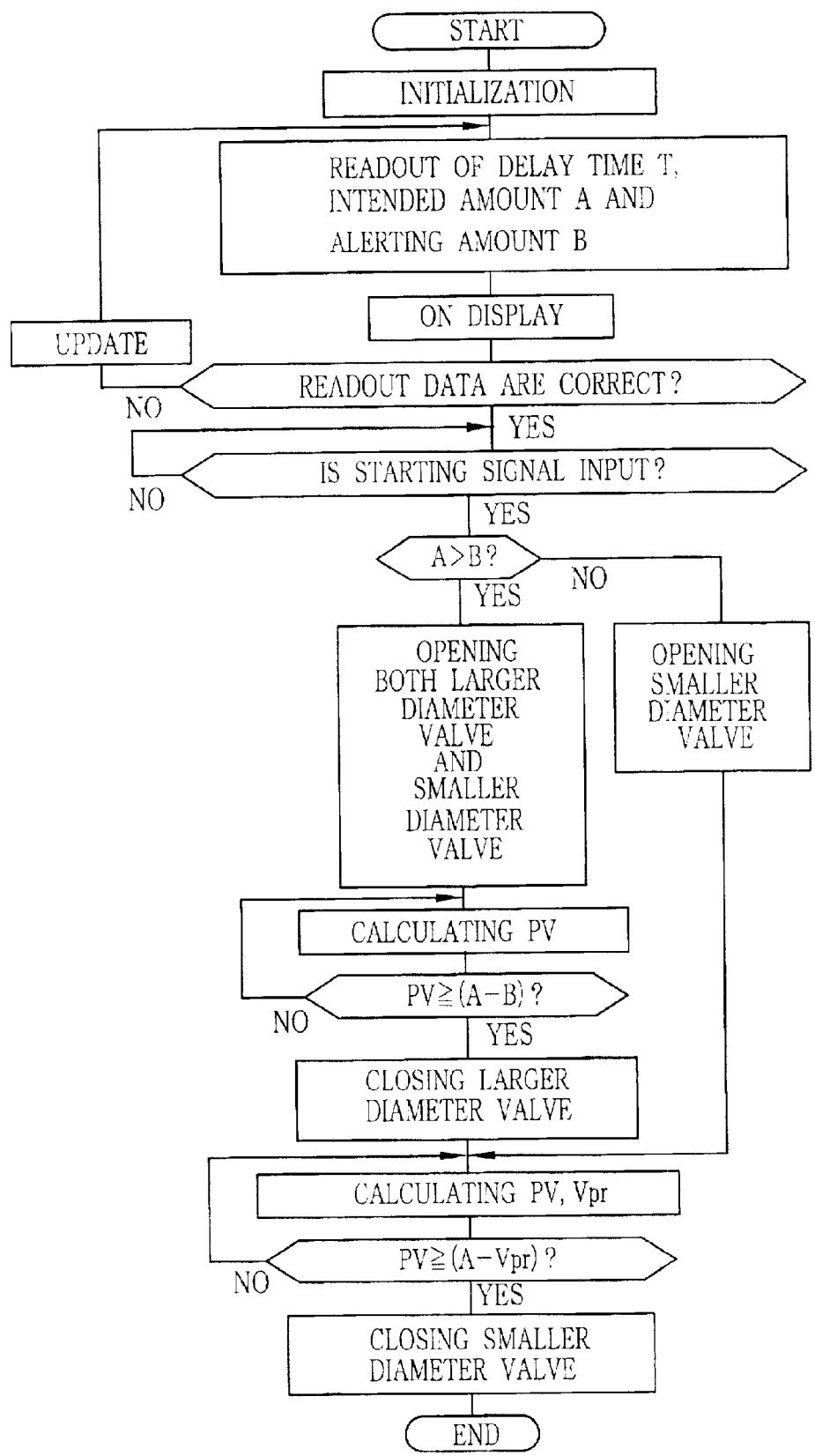
FIG. 7 shows a flow chart of controlling process procedure of the embodiment in FIG. 6.

Also in the embodiment, PLC is used as a measuring controller 20. As shown in FIG. 6, another measuring controller can be used in which the respective components, a low pass filter 50, a preset amount value calculating means 51, a total fed amount calculating means 52, a control means 53, a driver 54, a high-speed driver 55 and an inputting means 56 are hard-ware custom-designed devices. FIG. 7 shows a flow chart of measuring process procedure of this another embodiment using hard-ware measuring controller. In this embodiment, all the processing can be made so quick, almost instantaneously, that no need to calculate Δt to predict the time to generate the signal to shut off the valve in advance. Shut-off of the smaller diameter valve 14 is made just when a current total fed amount reaches the difference between the intended amount and the preset amount.

In the embodiments, the liquid 11 is fed from the stock tank 10 to the preparation vessel 15. The invention is not limited to the embodiments, but can be applied to powdered materials. Also weighing meter can be used instead of a flow meter where the weight change per time is used as a feeding rate Vf and total fed weight as a total fed amount PV. Preset amount Vpr is obtained based on the feeding rate Vf. This prediction control using a preset amount derived from a current rate and a delay time of a stopping system can also be applied to other any field of controlling measuring where an effect of delay time has to be considered, for example, a position controlling system, to obtain an accurate control.

It is also understood that the invention can be applied to measuring wide range of amount with high accuracy because fine control can be made at the final stage in the low feeding rate by using the most accurate preset amount derived from current rate.

What I claim is:

1. A feeding amount controlling apparatus comprising:
   feeding means for feeding a material;
   detecting means for detecting feeding rate of the material;
   first calculating means for calculating a total fed amount based on the feeding rate detected by the detecting means;
   stopping means for stopping feeding the material;
   second calculating means for calculating a preset amount by multiplying the feeding rate detected by the detecting means and delay time of the stopping means together; and
   controlling means for generating the signal for working the stopping means when the total fed amount calculated by the first calculating means reaches a value defined as the difference between an intended amount and the preset amount calculated by the second calculating means;
   wherein the feeding means comprises a feed rate shifting mechanism for shifting the feeding rate, the feed rate shifting mechanism being controlled by the controlling means.

2. A feeding amount controlling apparatus as defined in claim 1, wherein the controlling means is capable of operating the feeding rate shifting mechanism in order to shift the feeding rate from a high rate to a low one when the total fed amount reaches a value defined as the difference between the intended amount and an alerting amount.

3. A feeding amount controlling apparatus as defined in claim 2, wherein the controlling means is also capable of comparing the intended amount to the alerting amount at the start to measure the feeding amount and of operating the feeding rate shifting mechanism in order to shift the rate from high rate to low one when the intended amount is less than or equal to the alerting amount.

4. A feeding amount controlling apparatus as defined in claim 2, wherein the feeding rate shifting mechanism comprises larger diameter valve and smaller diameter valve which are respectively installed in main feeding line and by-pass feeding line thereof and can shift the feeding rate from high rate to low one by closing the large diameter valve.

5. Method for controlling a feeding amount of material comprising steps of:
   detecting a feeding rate;
   calculating a total fed amount based on the detected feeding rate;
   shifting the feeding rate from high to low when the total fed amount reaches a value of difference between the intended amount and the alerting amount;
   calculating a preset amount based on the detected feeding rate and delay time of stopping means to stop feeding the material; and
   generating a signal to work the stopping means when the calculated total fed amount reaches a value of difference between the intended amount and the preset amount.

6. Method for controlling a feeding amount of material comprising steps of:
   determining whether an intended amount is larger than an alerting amount;
   opening stopping means to allow the material to be fed at high feeding rate if the intended amount is larger than the alerting amount;
   detecting a feeding rate;
   calculating a total fed amount based on the detected feeding rate;
   shifting the feeding rate from high to low when the total fed amount reaches a value of difference between the intended amount and the alerting amount;
   calculating a preset amount based on the detected feeding rate and delay time of stopping means to stop feeding the material; and
   generating a signal to work the stopping means when the calculated total fed amount reaches a value of difference between the intended amount and the preset amount.

7. Method for controlling a feeding amount of material comprising steps of:
   determining whether an intended amount is larger than an alerting amount;
   opening feeding means to allow the material to be fed at low feeding rate if the intended amount is less than or equal to the alerting amount;

detecting a feeding rate;

calculating a total fed amount based on the detected feeding rate;

calculating a preset amount based on the detected feeding rate and delay time of stopping means to stop feeding the material; and generating a signal to work the stopping means when the calculated total fed amount reaches a value of difference between the intended amount and the preset amount.

8. Method for controlling a feeding amount of material comprising steps of:

determining whether an intended amount is larger than an alerting amount;

opening feeding means to allow the material to be fed at high feeding rate if the intended amount is larger than the alerting amount;

detecting a feeding rate;

calculating a total fed amount based on the detected feeding rate;

shifting the feeding rate from high to low when the total fed amount reaches a value of difference between the intended amount and the alerting amount;

calculating a preset amount based on the detected feeding rate and delay time of a stopping means to stop feeding the material, and a predicted feeding amount based on the detected feeding rate;

determining whether the intended amount is larger than a summation of calculated total fed amount, the preset amount and the predicted amount;

determining timing that when a signal for working the stopping means should be generated based on a remaining amount to be fed before generating the signal and the predicted feeding amount if the intended amount is less than or equal to the summation in the previous step.

9. Method as defined in claim 8, wherein the step of determining timing is made by calculating $\Delta t$ according to the following equation: $\Delta t = (A - PV - Vpr)/Vr$, wherein A is the intended amount, PV is the total fed amount, Vpr is the preset amount and Vr is the predicted feeding amount.

10. Method as defined in claim 9, wherein the steps until the step of determining whether the intended amount is larger than a summation of calculated total fed amount, the preset amount and the predicted amount are performed at slow scanning rate and the rest of the steps are performed at fast scanning rate.

11. Method for controlling a feeding amount of material comprising steps of:

determining whether an intended amount is larger than an alerting amount;

opening feeding means to allow the material to be fed at low feeding rate if the intended amount is less than or equal to the alerting amount;

detecting a feeding rate;

calculating a total fed amount based on the detected feeding rate;

calculating a preset amount based on the detected feeding rate and delay time of a stopping means to stop feeding the material, and a predicted feeding amount based on the detected feeding rate;

determining whether the intended amount is larger than a summation of calculated total fed amount, the preset amount and the predicted amount;

determining timing that when a signal for working the stopping means should be generated based on a remaining amount to be fed before generating the signal and the predicted feeding amount if the intended amount is less than or equal to the summation in the previous step.

* * * * *